May 16, 1961　　　J. A. BRADFORD　　　2,984,331
ARTICLE HANDLING APPARATUS
Filed July 1, 1957　　　　　　　　　　　　3 Sheets-Sheet 1
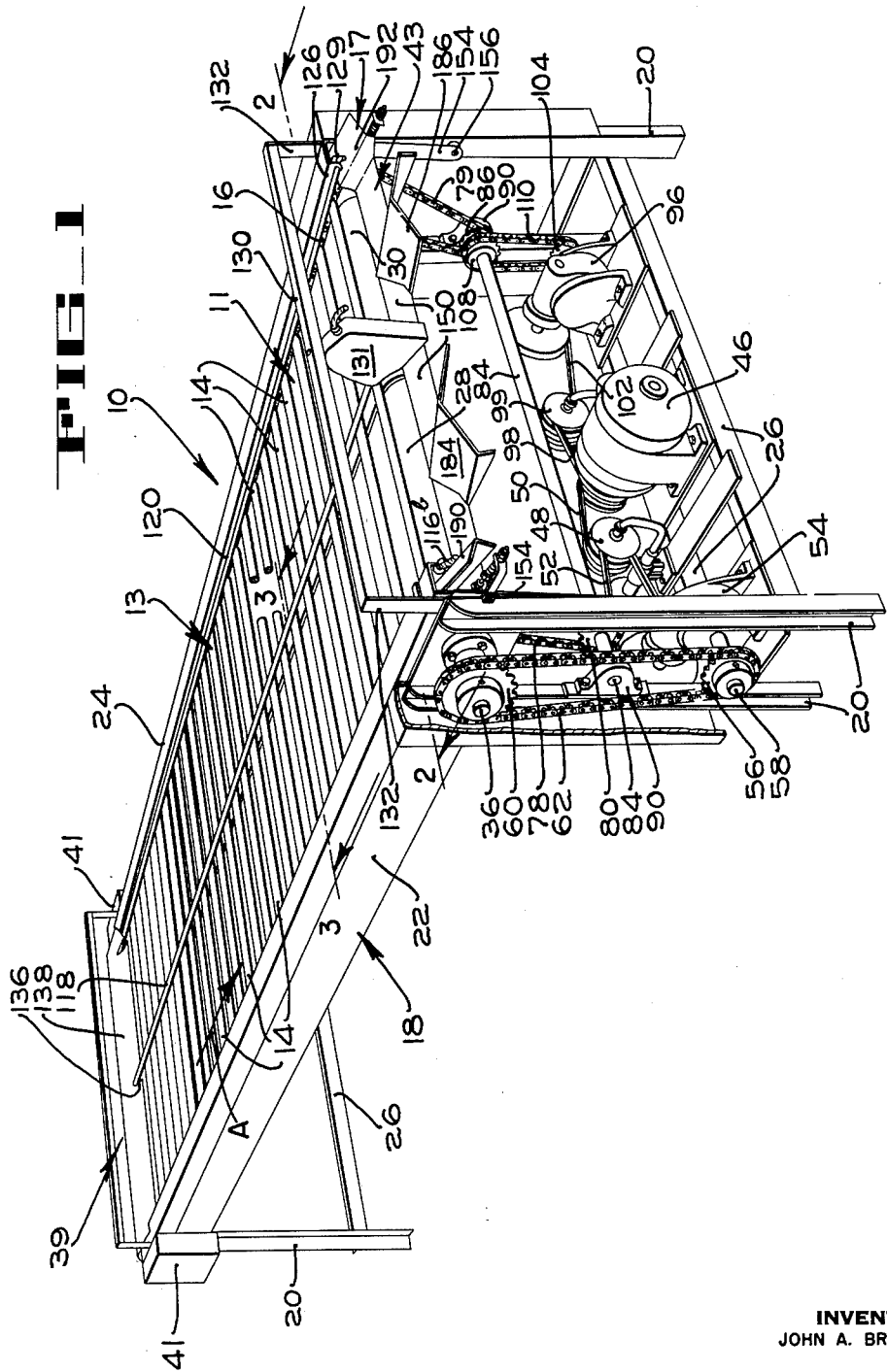
INVENTOR
JOHN A. BRADFORD
BY Hans G. Hoffmeister.
ATTORNEY May 16, 1961  J. A. BRADFORD  2,984,331
ARTICLE HANDLING APPARATUS
Filed July 1, 1957  3 Sheets-Sheet 2
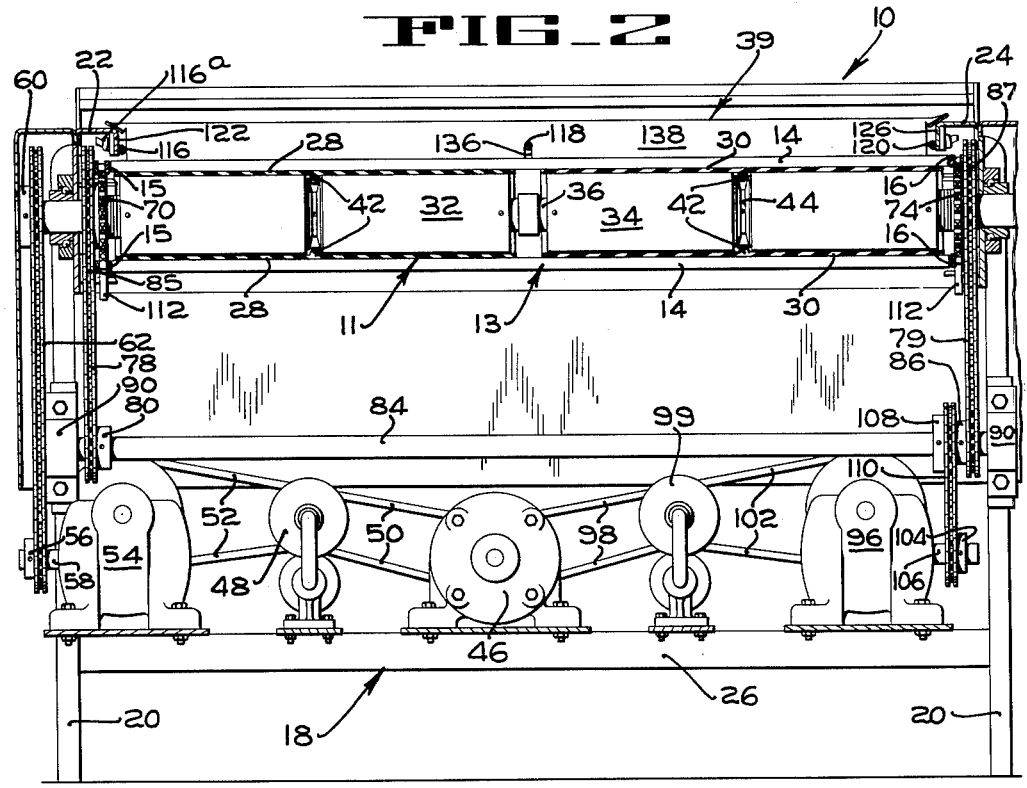
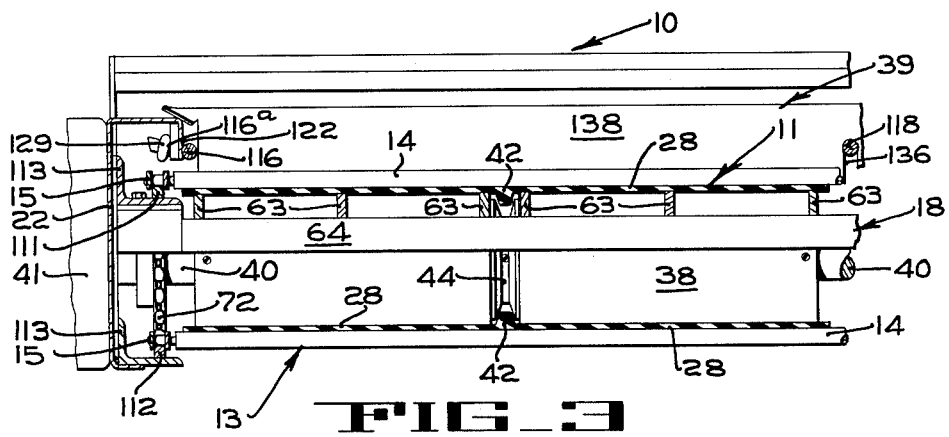
INVENTOR
JOHN A. BRADFORD
BY *Hans F. Hoffmeister*
ATTORNEY May 16, 1961
J. A. BRADFORD
2,984,331
ARTICLE HANDLING APPARATUS
Filed July 1, 1957
3 Sheets-Sheet 3
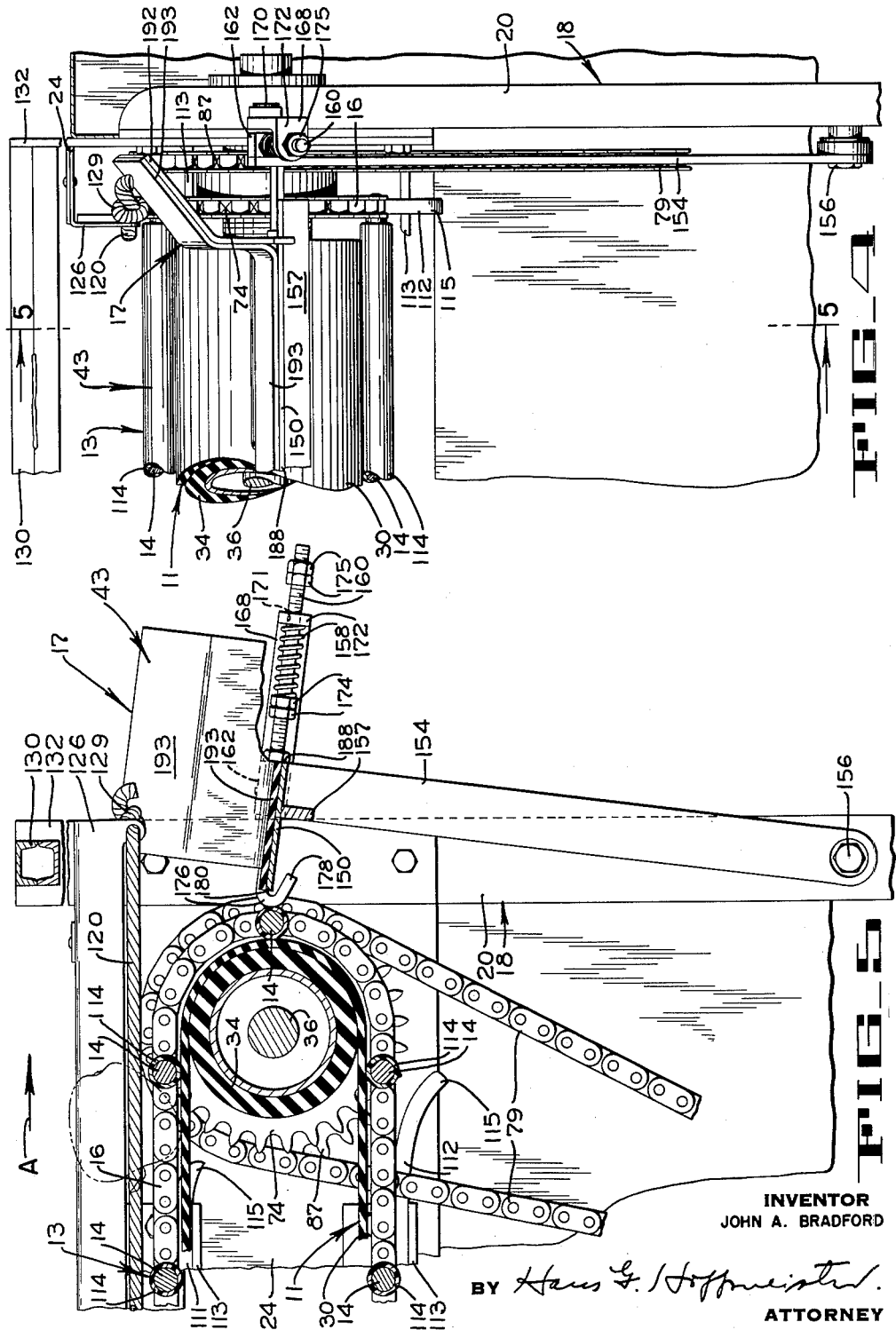
INVENTOR
JOHN A. BRADFORD
BY Hans F. Hoffmeister
ATTORNEY United States Patent Office 2,984,331
Patented May 16, 1961

2,984,331
ARTICLE HANDLING APPARATUS
John A. Bradford, Wenatchee, Wash., assignor to Food Machinery and Chemical Corporation, San Jose, Calif., a corporation of Delaware
Filed July 1, 1957, Ser. No. 669,062
13 Claims. (Cl. 198—33)

This invention appertains to article handling apparatus, and more particularly relates to a table for rolling and tumbling articles to facilitate their inspection and sorting.

An object of the present invention is to provide an improved table for use in the inspection and sorting of articles, such as apples.

Another object is to provide a sorting table arranged to roll articles being sorted, to retard the forward movement of the articles as they are being sorted and to repel the articles being retarded away from the retarding means.

Another object is to provide an improved sorting table arranged to reverse the direction of rotation of articles immediately before discharging the articles from the table.

Another object of the present invention is to provide a sorting table having an improved discharge mechanism.

Another object is to provide an improved means by which the rate of forward movement of articles on a sorting table and the speed at which the articles are rolled and tumbled may be varied.

These and other objects and advantages of the present invention will become apparent from the following description and drawings in which:

Fig. 1 is a perspective of the sorting table of the present invention with certain parts being cut away to more clearly disclose internal operating mechanism.

Fig. 2 is a vertical section taken along lines 2—2 of Fig. 1.

Fig. 3 is an enlarged fragmentary vertical section taken along lines 3—3 of Fig. 1.

Fig. 4 is an enlarged end elevation of a portion of the sorting table, showing a portion of the discharge mechanism.

Fig. 5 is a fragmentary longitudinal section taken along lines 5—5 of Fig. 4.

In general, the article handling apparatus of the present invention comprises a table 10 (Fig. 1) having an article supporting conveyor 11 and an article retarding and tumbling mechanism 13 mounted thereon. The article supporting conveyor 11 (Fig. 5) is of the endless belt type, while the retarding and tumbling mechanism 13 comprises a plurality of rollers 14 carried on a pair of endless chains 15 and 16 (Fig. 2). The retarding mechanism 13 is trained around the article supporting conveyor 11 in such a manner that the rotatable rollers 14 extend laterally across the upper run of the conveyor in rolling contact with the surface thereof. Both the conveyor 11 and the rollers 14 are arranged to be driven in the same direction, but the rollers are driven at a speed that is slower than that of the conveyor 11. As the rollers 14 roll over the surface of the article supporting conveyor 11, they retard the forward motion of articles supported on the faster moving conveyor 11 and cause the articles to roll and tumble so that all parts of the articles may be easily seen by the inspecting personnel. The inspector removes undesirable articles from the conveyor 11 and permits the desirable articles to be carried to a reciprocating discharge mechanism 17 (Fig. 5) which cooperates with the conveyor 11 and with the rollers 14 to assure a gentle discharge of the articles from the sorting table 10, so that the articles will not be bruised or injured.

More specifically, the sorting table 10 includes a frame 18 (Figs. 1 and 2) having a plurality of vertical legs 20, longitudinally extending side members 22 and 24, and transverse bracing members 26.

The article supporting conveyor 11 comprises a pair of longitudinal endless rubber belts 28 and 30 disposed in side by side relation and trained around driving drums 32 and 34 (Fig. 2) respectively, which are keyed to a drive shaft 36 positioned adjacent the discharge end of the table 10. The belts 28 and 30 are also trained around similar, laterally aligned idler drums 38 (Fig. 3) (only one of which is shown), at the inlet end 39 (Fig. 1) of the table. The drums 38 are mounted on a freely rotatable tail shaft 40 (Fig. 3) that is journalled in suitable bearings enclosed by housings 41 (Fig. 1). As clearly shown in Figs. 2 and 3, each belt 28 and 30 is provided with a ridge 42 of fragmentary V-shape on its inner surface. The ridge 42 of the belt 28 is received within longitudinally aligned grooves 44 formed in the drums 32 (Fig. 2) and 38 (Fig. 3), while the ridge 42 on the belt 30 is received within the groove 44 on the drum 34 (Fig. 2) and within a similar groove formed in its associated idler drum 38 (not shown).

In order to drive the article supporting conveyor 11, a motor 46 (Figs. 1 and 2) is connected at the discharge end 43 of the table to a variable speed drive means 48 by a V-belt 50. A second V-belt 52 connects the variable speed drive means 48 with a speed reducing gear box 54. A drive sprocket 56 is keyed to the output shaft 58 of the gear box 54 while a driven sprocket 60 is keyed to the conveyor drive shaft 36. A chain 62 is trained around the sprockets 56 and 60. The motor 46, the variable speed drive means 48, and the gear box 54 are all securely bolted to transverse frame members 26 which are located below the conveyor 11 and adjacent the discharge end of the sorting table 10.

As shown in Fig. 3, a plurality of longitudinally extending belt supporting strips 63 are welded to several transverse frame members 64 (only one of which is shown), which extend across the table beneath the upper run of the conveyor 11. These frame members 64 are positioned so as to place the strips 63 in sliding and supporting engagement with the lower surface of the upper run of each conveyor belt 28 and 30 to maintain the upper runs thereof in a horizontal plane throughout substantially their entire length.

The retarding and tumbling mechanism 13 (Fig. 1 and 2) comprises the previously mentioned pair of endless chains 15 and 16, one of which is disposed adjacent each side of the article supporting conveyor 11. The chain 15 (Fig. 2) is trained around a sprocket 70 which is rotatably received on the drive shaft 36, and around a sprocket 72 (Fig. 3) which is mounted for rotation on the tail shaft 40. Similarly, the chain 16 (Fig. 2) is trained around a sprocket 74 which is rotatably received on the drive shaft 36 and around a sprocket (not shown) which is mounted for rotation on the tail shaft 40. The spaced rollers 14 of the retarding mechanism 13 are parallel to each other, and are rotatably mounted on and extend transversely between the two chains 15 and 16.

The roller-carrying chains 15 and 16 are driven by a pair of vertical chains 78 and 79 (Fig. 2). The chain 78 is trained around a sprocket 80 keyed to an idler shaft 84 and around a sprocket 85 that is secured to the sprocket 70, as by welding. Similarly, the chain 79 is trained around a sprocket 86 keyed to idler shaft 84 and around a sprocket 87 welded to sprocket 74. The idler shaft 84, which is journalled in bearings 90 bolted to the frame 18, is driven by the motor 46 which is connected to a speed reducing gear box 96 by means of a V-belt 98, a variable speed drive means 99, and a V-belt 102. A drive sprocket 104 is keyed to the output shaft 106 of the gear box 96 and is connected in driving engagement to a driven sprocket 108, which is keyed to the idler shaft 84 by a chain 110. Both the article supporting conveyor 11 and the rollers 14 are driven in the direction of the arrow A (Figs. 1 and 5). However, the rollers 14 are driven at a speed which is slower than that of the article supporting conveyor 11 in order that the rollers 14, which rotate in a counterclockwise direction (Fig. 5), will roll the articles in a counterclockwise direction. The rotation of the rollers will cause the articles to be repelled, thereby further retarding their forward movement.

In order to support the upper run and the lower run of the chains 15 and 16 (Figs. 3 and 5), upper and lower guide bars 111 and 112, respectively, are welded to longitudinal angle bars 113 which project inwardly from the longitudinal side frame members 22 and 24, and are disposed in position to receive the lower surface of the respective chains 15 and 16 in supporting relation. The ends of the bars 111 and 112 are downwardly bent as indicated at 115 in Fig. 5.

Since the sorting table of the present invention is intended for use in the inspection of easily injured articles such as apples or pears, and since injury to these articles during inspection cannot be permitted, each of the rollers 14 is covered with a tubular sleeve 114 of a resilient material such as plastic. Also, three longitudinally extending ropes 116, 118 and 120 (Fig. 2) are provided to prevent the articles from striking the inturned upper edges of the longitudinal side members 22 and 24 of the sorting table 10 and for dividing the table 10 into two parallel lanes. The rope 116 has one end 116a (Fig. 3) secured in a hole (not shown) in a depending flange 122 at the inlet end of the table, and its other end 116b (Fig. 1) secured in a hole in the same depending flange 122 at the discharge end of the table. Similarly, the rope 120 is stretched between holes (not shown) formed in opposite ends of a depending flange 126 which is a part of the longitudinal side member 24. The ropes 116 and 120 are held in position by knots 129 formed adjacent the ends thereof as best shown in Figs. 2 and 3. The rope 118 is held at one end in a bracket 131 (Fig. 1) that is bolted to a transverse bar 130 at the transverse midpoint thereof. The bar 130 extends over the discharge end of the table 10 and is welded to a vertical arm 132 at each end thereof. The arms 132 are secured, as by bolting, to two of the laterally disposed legs 20 of the frame 18. The other end of the rope 118 extends through a slot 136, which is formed at the lateral midpoint of an inlet apron 138, and is anchored to any suitable means, as for example, a transverse frame member (not shown).

The discharge control mechanism 17 (Figs. 1, 4 and 5) is provided in order to assure a gentle and trouble-free discharge of articles from the sorting table 10, and to accomplish the discharge with very little, if any, free fall of the articles being sorted. The discharge mechanism 17 comprises a transversely extending runoff plate 150 which is secured between two elongated downwardly directed pivot arms 154. The pivot arms 154 are pivotally connected by bolts 156 to two of the transversely spaced legs 20 at the discharge end of the frame 18. Both sides of the discharge mechanism 17 are identical, therefore a description of the right hand side as shown in Figs. 4 and 5 will adequately disclose the entire mechanism.

A stiffening bar 157 is welded to the arms 154 and to the lower surface of the runoff plate 150 for strengthening the same. A helical compression spring 158 is disposed around a bolt 160 which is screwed into a block 162 welded to the upper end of the arm 154. An angle bracket 168 is pivotally connected to the vertical frame member 20 by means of a pin 170. The bolt 160 is received for reciprocal movement in an opening 171 formed in a transverse leg 172 of the bracket 168. The spring 158 is supported by the bolt 160 and is compressed between the transverse leg 172 and lock nuts 174 (Fig. 5) on the bolt 160. The spring 158 serves to resiliently urge the discharge mechanism 17 toward the discharge end of the conveyor 11. A pair of lock nuts 175 are threaded on the bolt 160 outwardly of the transverse leg 172 to limit the counterclockwise pivotal movement (Fig. 5) of the discharge mechanism 17. A follower finger 176 (Fig. 5) is welded to the runoff plate 150 and has a J-shaped end portion 178 which projects into the path of movement of the rollers 14. Thus, each roller 14 of the retarder 13 contacts the end portion 178 of the finger 176 and pivots the discharge mechanism 17 clockwise (Fig. 5) about the bolts 156 against the resistance of the spring 158. As soon as each roller 14 moves out of contact with the finger 176, the spring 158 pivots the mechanism 17 counterclockwise to a position closely adjacent the article supporting conveyor 11. The aforementioned lock nuts 175 are so positioned on the bolt 160 as to prevent the J-shaped end portion 178 of the finger 176 from riding against the conveyor 11, while permitting the J-shaped end portion 178 to lie within the path of movement of the rollers 14. Hence, the leading edge 180 of the runoff plate 150 is positively held closely adjacent the belts 28 and 30 of the conveyor 11 except during the interval when the rollers 14 force the plate 150 away from the belts 28 and 30. Therefore, as will be explained in more detail later, the articles are gently transferred from the supporting conveyor 11 to the runoff plate 150 of the discharge mechanism 17 with very little chance of any of the articles becoming wedged between the conveyor 11 and the runoff plate 150.

In some sorting operations it is desirable that the articles being inspected on the sorting table 10 (Fig. 1) be discharged into separated lanes rather than discharged across the full width of the runoff plate 150. In order to accomplish this separation, V-shaped shunts 184 and 186 are welded to and extend beyond the trailing edge 188 of the discharge mechanism 17. The shunts 184 and 186 cooperate with the aforementioned bracket 131 and side plates 190 and 192 to direct the discharge of articles from the discharge mechanism 17 into four separate lanes. The side plates 190 and 192 are welded to the runoff plate 150 adjacent opposite sides thereof and project beyond the trailing edge 188 of the plate 150. It is to be understood that the oscillatory motion of the discharge mechanism 17 substantially eliminates any tendency for articles to bridge across the restricted openings between the shunts 184 and 186 and their adjacent side plates 190 and 192, respectively. A rubber pad 193 may be secured in any suitable manner over the runoff plate 150 and the side plates 190 and 192 to prevent bruising of the articles.

In the operation of the sorting table 10 of the present invention, rotatable articles such as apples, pears, or other fruits or vegetables, are fed into the sorting table over the inlet apron 138 (Fig. 1) from any suitable supply means, such as from a feed conveyor. The article-supporting conveyor 11 is driven in the direction of the arrow A (Fig. 1) by the motor 46 and receives the articles thereon between the rollers 14. Since the motor 46 drives the rollers 14 in the same direction as the supporting conveyor 11 but at a slower speed, the rollers 14 serve to retard the forward motion of the articles supported on the conveyor 11. This difference in speed causes the articles to be tumbled in a counterclockwise direction (Fig. 5). Since the rollers 14 are arranged to roll on the faster moving belts 28 and 30 of the conveyor 11, the rollers are also rotated counterclockwise. When the rollers 14 and the articles are both rotating counterclockwise, the articles will be repelled by the rollers when they move into contact therewith. Thus, when retarding contact is made between the rollers 14 and the articles, the articles are temporarily moved rearwardly in such a manner that they are caused to continuously roll on the article supporting conveyor and yet practically stop their forward movement for short time intervals as they are advanced from one end of the table to the other. This pause in the forward movement of the articles makes it easier for operators to examine and sort the rotating articles.

By adjusting the variable speed drive means 48 and 96 (Fig. 1) the speed of both the article supporting conveyor 11 and the rollers 14 may be varied to provide the most appropriate speed range for the particular articles being sorted. For example, if a batch of articles which requires a great deal of sorting is being examined on the table 10, the variable speed drive means 48 and 96 would be arranged so as to provide a very slow rate of speed of the rollers 14 and a somewhat faster rate of speed of the supporting conveyor 11 to effect a slow advancement of the articles from one end of the table 10 to the other and a rapid rotation of the articles. If a batch of articles, which requires only a small amount of inspection and sorting is to be examined on the sorting table 10, the variable speed drive means would be selectively arranged to drive the rollers 14 at a high rate of speed while the article supporting conveyor 11 would be driven at a speed only slightly faster than the speed of the rollers. In this way, the volume of flow across the table 10 may be controlled in order to make best use of the sorting personnel's time.

After the articles have been inspected and the defective articles have been removed by hand from the sorting table 10, the remaining articles are gently discharged from the table over the discharge mechanism 17.

As has been previously mentioned, the articles, while on the upper run of the conveyor 11 are caused to roll on the surface of the conveyor 11 and are both retarded and repelled by the rollers 14. While in this position, the articles roll on the conveyor 11 and are retarded by the rollers 14 because the weight of the articles is supported by the conveyor 11 and, hence, the greatest rotative force acting on the articles is that force which exists between the conveyor 11 and the articles. This condition is reversed, however, when the articles travel around the downwardly curved surface of the conveyor 11 at the discharge end thereof. The weight of the articles then becomes primarily supported on their retarding rollers 14, hence the rollers 14 then determine the direction of rotation of the articles and cause the articles to reverse their direction of rotation. Since the direction of movement between the articles and the conveyor 11 at their point of contact is reversed when the weight is primarily supported on the rollers, the article is repelled from the discharge end of the conveyor 11 and is positively but gently transferred from its supporting roller to the runoff plate 150 of the discharge mechanism 17 with a minimum, if any, drop. The direction of rotation of the articles as they contact the runoff plate 150 is toward the trailing edge 188 thereof thus expediting the discharge of the articles from the table 10.

The transfer of the articles from the rollers 14 to the runoff plate 150 of the discharge mechanism 16 occurs shortly before the discharge mechanism 17 is contacted and pivoted in a clockwise direction by one of the rollers 14. This timing assures a gentle transfer of articles to the runoff plate 150.

If it should be desired to discharge the articles into lanes, the shunts 184 and 186 (Fig. 1) are secured on the runoff plate 150 of the discharge mechanism 17. The use of two shunts 184 and 186, as shown in Fig. 1, causes discharge of the articles into four lanes and obviously considerably restricts the openings through which articles must be discharged. Hence, there is a strong tendency for the articles to bridge across the restricted discharge opening. Bridging of the articles, however, is prevented by the reciprocation of the discharge mechanism 17 each time it is contacted by a roller 14.

The sorting table of the present invention, therefore, provides an efficient arrangement wherein the rollers of the roller conveyor are arranged to both retard and repel the articles on the supporting conveyor as well as to cause the articles to roll thereon for ease of inspecting the same. The repelling action also causes the articles to periodically substantially stop their forward movement on the sorting table while the articles continue to roll, facilitating the inspection operation. The improved discharge mechanism cooperates with the conveyors to gently discharge articles therefrom.

When sorting certain types of fruit, it is desirable that the fruit be inspected while being advanced with a substantially continuous, forward rolling movement rather than with the previously-described, advantageous, retarded forward movement. To obtain a continuous forward movement, the rollers 14 are moved forward at a speed which is faster than the speed of the conveyor 11 and this change in the relative speed of the belt and the rollers is obtained by suitable regulation of the variable speed drive means 48 and 96. The direction of rotation of the rollers 14 and of the fruit will then be clockwise as viewed in Figure 5 rather than counterclockwise as previously described. Since the articles are positively pushed by the rollers 14 and do not depend for propulsion upon the less positive flat surface of the supporting conveyor 11, the articles tend to remain closely adjacent their pushing rollers 14.

It will be understood that various changes and modifications may be made without departing from the spirit of the invention or the scope of the appended claims.

Having thus described the present invention and the manner in which the same is to be used, what I claim as new and desire to protect by Letters Patent is:

1. Article handling apparatus comprising a conveyor having a horizontal article supporting and conveying surface, means for driving said conveyor, an article retarding mechanism movable along a path closely adjacent said conveying surface and arranged to engage articles on said surface, means for driving said mechanism at a speed slower than the speed of said conveying surface so that the articles are moved against a trailing surface of said retarding mechanism to retard the motion of articles being advanced thereon and to cause the articles to roll and tumble on the conveyor to facilitate the inspection of the articles.

2. Article handling apparatus comprising a conveyor having a horizontal article supporting and conveying surface, means for driving said conveyor, an article retarding mechanism adjacent said conveyor and including a plurality of parallel article engaging and retarding rollers mounted at equally spaced intervals and disposed in rolling engagement against said conveying surface, means for driving said retarding mechanism to move said rollers over said conveying surface at a speed slower than the speed of said conveying surface, and means for depositing articles to be sorted on said conveying surface between said rollers.

3. Article handling apparatus comprising a conveyor having an article supporting and conveying surface, means for driving said conveyor, an endless chain retarding mechanism trained around said conveyor and driven at a speed slower than the speed of said conveying surface and including a plurality of parallel article engaging and retarding rollers mounted at equally spaced intervals and disposed in rolling engagement against said conveying surface, and a discharge control mechanism pivotally mounted at one end of the conveyor and arranged to be contacted and moved away from said article supporting conveyor by each of said rollers as they pass thereby.

4. Article handling appratus comprising a rotatable drum, means for driving said drum, an endless article supporting and conveying belt trained around said drum and arranged to be driven by said drum at a predetermined rate of speed, an endless chain article retarding mechanism having a plurality of parallel spaced rollers positioned in rolling engagement with the upper run of said article supporting belt and with the portion of the belt disposed around said drum, means for driving the rollers at a speed slower than the speed of said conveying belt, means for depositing articles on said belt between adjacent rollers, each of said rollers being arranged to engage and retard the forward motion of articles on said belt to cause the same to rotate in a predetermined direction on the belt and to be repelled rearwardly from the roller while the greater part of the weight of the article is supported on the upper run of said conveying surface, each roller being arranged to reverse the direction of rotation of the article as said article is advanced around said drum and becomes supported mainly on the roller whereby the article is repelled from the supporting conveyor and discharged from the conveying belt.

5. Article handling apparatus comprising an endless conveyor having a horizontal article supporting and conveying surface arranged to be moved in a predetermined path, spaced parallel endless chains disposed on opposite sides of the conveyor and arranged to be moved in a predetermined path adjacent the path of movement of said surface, a plurality of straight, elongated spaced rollers journalled for rotation on said chains and arranged to extend transversely across said conveying surface in rolling engagement therewith, and drive means connected to said endless conveyor and to said chains for driving said conveying surface at a speed in excess of the speed of said chains, said rollers being arranged to be rotatably driven by said conveying surface to engage and retard the forward movement of articles on said surface and to roll the articles to facilitate inspection of the articles.

6. Article handling apparatus comprising a conveyor having an article supporting and conveying surface arranged to move in a predetermined path, a retarding mechanism mounted for movement adjacent said conveying surface and including a plurality of spaced parallel rollers extending transversely across said conveying surface in rolling engagement therewith, a prime mover disposed adjacent said conveyor, a first variable speed drive member connected to said prime mover and to said article supporting conveyor for driving said conveying surface, and a second variable speed drive member connected to said prime mover and to said retarding mechanism for moving said rollers at speeds slower than the speed of said conveying surface, said rollers being arranged to roll on said conveying surface to retard the forward movement of articles being advanced thereon and to cause the articles to roll on said surface to facilitate the inspection of the articles.

7. Article handling apparatus comprising a support structure, a conveyor mounted on said structure and having a conveying surface arranged to be moved in a predetermined path, a retarding mechanism disposed adjacent said conveyor and including a plurality of spaced parallel rollers extending transversely across said conveying surface in contacting engagement therewith, drive means connected in driving relation to said conveyor and to said rollers, said drive means being arranged to move said rollers at a speed slower than the speed of said conveying surface for retarding the forward movement of the articles on said surface and for causing the rollers and the articles to roll on said surface, a discharge mechanism pivotally mounted adjacent one end of said conveyors, said discharge mechanism being disposed in the path of movement of said rollers to be contacted and moved outwardly away from said conveying surface by each of said rollers as said roller passes thereby, and resilient means connected between said support structure and said discharge mechanism for urging said discharge mechanism into close proximity to said conveying surface.

8. Article handling apparatus comprising a support structure, an endless belt conveyor mounted on said structure, an endless chain retarding mechanism encircling said endless belt and having a plurality of spaced parallel rollers extending transversely across said belt in contacting engagement therewith, drive means connected to said belt and to said rollers and arranged to drive said belt at a speed faster than the speed of said rollers, a downwardly angled plate pivotally mounted on said support structure adjacent the discharge end of said belt, resilient means connected between said structure and said plate and arranged to urge said plate toward said belt, stop means for limiting the movement of said plate toward said belt, and roller engaging means rigidly secured on said plate and disposed in position to be contacted by said rollers as said rollers move around the discharge end of said belt to cause said plate to pivot away from said belt, said resilient means being arranged to hold said plate against said stop means and in a position closely adjacent said belt to receive articles therefrom.

9. Article handling apparatus comprising a conveyor having an article conveying surface, a retarding mechanism disposed adjacent said conveyor and having a plurality of spaced rollers arranged to roll on said conveying surface and engage articles on said conveying surface, drive means connected to said conveyor and to said rollers and arranged to drive said rollers at a speed slower than that of said conveying surface, and a flexible member stretched longitudinally over said surface closely adjacent thereto to divide said surface into two parallel surfaces.

10. In an article handling apparatus having a frame, an endless article supporting conveyor mounted on the frame and having a discharge end, and an article retarding mechanism mounted on the frame for movement around said conveyor and having a plurality of rollers positioned to roll on the surface of the article supporting conveyor, a discharge mechanism comprising a pair of spaced arms mounted for pivotal movement on said frame, a runoff plate secured to said arms and positioned adjacent the discharge end of said conveyor, a follower finger secured to said runoff plate and arranged to project into the path of movement of said rollers to be contacted thereby as they move therepast to pivotally move the runoff plate away from said conveyor, a bracket pivotally mounted on said frame adjacent the discharge end of said conveyor and projecting outwardly therefrom, an apertured extension on said bracket and projecting transversely of said bracket, a threaded shaft rigid on one of said arms and arranged to project through the aperture in said extension, a nut received on said shaft, a spring mounted on said shaft and positioned between said nut and said projection to resiliently urge said runoff plate towards said conveyor and to urge said finger into the path of travel of said rollers, and a lock nut secured adjacent the outer end of the shaft and arranged to abut said extension to limit movement of said plate toward said conveyor to prevent said runoff plate from riding against the surface of said conveyor.

11. An article handling apparatus comprising a conveyor having a horizontal article supporting and conveying surface, article controlling means adjacent said conveyor including a plurality of parallel article contacting rollers mounted at equally spaced intervals and disposed in rolling engagement against said conveying surface, and drive means connected to said conveyor and to said article controlling means for driving said conveyor and said controlling means in the same direction and at different speeds to cause articles being advanced on said conveying surface to roll on said surface to facilitate the inspection of the articles.

12. An article handling apparatus comprising a conveyor having an article supporting and conveying surface, article controlling means adjacent said conveyor including a plurality of parallel article contacting rollers mounted at equally spaced intervals and disposed in rolling engagement against said conveying surface, drive means connected to said conveyor and to said article controlling means for driving said conveyor and said controlling means at different speeds to cause articles being advanced on said conveying surface to roll on said surface to facilitate the inspection of the articles, and a discharge mechanism pivotally mounted at one end of the conveyor for movement from a position close to said conveying surface to a position spaced from said surface and arranged to be contacted and moved away from said article supporting conveyor by each of said rollers as the rollers pass said discharge mechanism.

13. Article handling apparatus comprising a conveyor having an article supporting and conveying surface, means for driving said conveyor, an endless chain retarding mechanism trained around said conveyor and driven at a speed slower than the speed of said conveying surface and including a plurality of parallel article engaging and retarding rollers mounted at equally spaced intervals and disposed in rolling engagement against said conveying surface, and a discharge control mechanism movably mounted at one end of the conveyor and arranged to be contacted and moved away from said article supporting conveyor by each of said rollers as they pass thereby.

References Cited in the file of this patent

UNITED STATES PATENTS

| | | |
|---|---|---|
| 534,783 | Cerruti | Feb. 26, 1895 |
| 1,102,496 | Gray | July 7, 1914 |
| 1,283,949 | Stevenson | Nov. 5, 1918 |
| 1,602,716 | Smith | Oct. 12, 1926 |
| 2,298,614 | Carroll | Oct. 13, 1942 |
| 2,356,485 | Webb | Aug. 22, 1944 |
| 2,796,967 | Myer | June 25, 1957 |

FOREIGN PATENTS

| | | |
|---|---|---|
| 863,724 | Germany | Jan. 19, 1953 |